(12) United States Patent
Sahu et al.

(10) Patent No.: US 10,631,469 B2
(45) Date of Patent: Apr. 28, 2020

(54) INTELLIGENT WEB-ENABLED PLANT GROWING SYSTEM AND METHOD OF GROWING PLANT

(71) Applicant: Science Cadets, Inc., San Jose, CA (US)

(72) Inventors: Anwesh Patnaik Sahu, San Jose, CA (US); Ronal Ray Thompson, Freedom, CA (US); Abdul Salam Assaad, Foster City, CA (US); Howard Allen Wilson, IV, Tracy, CA (US); Dong Yu, Fremont, CA (US); Saroj Kumar Sahu, San Jose, CA (US)

(73) Assignee: Science Cadets, Inc., San Jose, CA (US)

( * ) Notice: Subject to any disclaimer, the term of this patent is extended or adjusted under 35 U.S.C. 154(b) by 318 days.

(21) Appl. No.: 15/866,906

(22) Filed: Jan. 10, 2018

(65) Prior Publication Data

US 2019/0208711 A1 Jul. 11, 2019

(51) Int. Cl.
| | | |
|---|---|---|
| A01G 7/04 | (2006.01) |
| A01G 31/02 | (2006.01) |
| A01G 31/06 | (2006.01) |
| A01G 27/00 | (2006.01) |
| A01G 9/24 | (2006.01) |

(52) U.S. Cl.
CPC ............. *A01G 7/045* (2013.01); *A01G 9/247* (2013.01); *A01G 27/008* (2013.01); *A01G 31/06* (2013.01); *A01G 31/02* (2013.01)

(58) Field of Classification Search
CPC . A01G 2/00; A01G 7/00; A01G 7/045; A01G 31/00; A01G 2031/006; A01G 31/02; A01G 31/06
USPC .... 47/60, 61, 62 R, 63, 79, 58.1 R, 58.1 LS, 47/58.1 SE
See application file for complete search history.

(56) References Cited

U.S. PATENT DOCUMENTS

| | | | |
|---|---|---|---|
| 9,241,453 B1 * | 1/2016 | Martin | A01G 31/02 |
| 9,526,215 B2 * | 12/2016 | Suntych | A01G 7/045 |
| 9,788,495 B2 | 10/2017 | Martin et al. | |
| 9,813,883 B2 | 11/2017 | Michaelis et al. | |
| 9,974,243 B2 * | 5/2018 | Martin | A01G 31/047 |
| 2017/0357893 A1 | 12/2017 | Dexter et al. | |
| 2017/0357910 A1 | 12/2017 | Sommer | |

\* cited by examiner

*Primary Examiner* — David J Parsley
(74) *Attorney, Agent, or Firm* — Chen-Chi Lin

(57) ABSTRACT

An intelligent web-enabled plant growing system controls environmental conditions inside it to grow sprouts, microgreens and plants from seeds placed in it without much intervention of humans through the growing process. Photographs of the sprouts, microgreens and plants are taken periodically by a camera. A computer then uploads the photographs to a server. The server runs artificial intelligence programs to determine the state of the growth and suggests back to the computer how to operate the controls for environment. A user application program on a remote computer or mobile device reports the state of the box, enables the user to buy seeds, enables the user to make own recipes, and enables multiple users to share their growing experience and custom recipes.

16 Claims, 5 Drawing Sheets

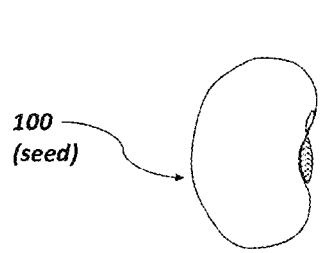
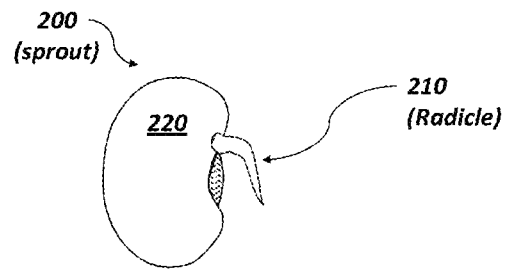
FIG. 1
(Prior Art)
FIG. 2
(Prior Art)

INTELLIGENT WEB-ENABLED PLANT GROWING SYSTEM AND METHOD OF GROWING PLANT

FIELD OF THE INVENTION

This invention relates generally to an intelligent web-enabled plant growing system and a method of using the intelligent web-enabled plant growing system to grow plant. More particularly, the present invention relates to an efficient and autonomous method to grow sprouts and microgreens in a controlled condition.

BACKGROUND OF THE INVENTION

FIG. 1 shows a seed 100. FIG. 2 shows a sprout 200. The sprout 200 is defined as a seed 100 which has been soaked and left to germinate so that a radicle 210 has come out and skin 220 of the seed 100 has cracked. In one example, the sprout 200 is a moong lentil. In another example, the sprout 200 is a garbanzo bean. FIG. 3 shows a portion of a microgreen 300. The portion of the microgreen 300 is defined as a seed (for example, the seed 100 of FIG. 1) that has been fully germinated. The portion of the microgreen 300 has a developed root 305, a hypocotyl 304, a cotyledon 303, an epicotyl 306, and first true leaves 302. In one example, the microgreen 300 is a radish. In another example, the microgreen 300 is a kale. In still another example, the microgreen 300 is a broccoli. Photosynthesis (and therefore bright sunlight) is not needed for seeds to evolve into microgreens. However, leaves 301 may start growing when sunlight is available.

SUMMARY OF THE INVENTION

The present invention discloses a plant growing system includes a housing, two or more transparent cans, and two or more trays. In one example, the plant growing system is an indoor system. An internal space of the housing is divided into an upper chamber and a lower chamber by a thermally insulating separator. The two or more transparent cans are disposed in the lower chamber of the internal space of the housing. The two or more trays are arranged vertically in the upper chamber of the internal space of the housing. In one example, lighting panels are arranged in the upper chamber of the internal space of the housing.

A method of using the plant growing system to grow plants is disclosed. The method comprises the steps of initially soaking seeds at the ambient temperature in the two or more transparent cans in the lower chamber for a first predetermined time period; keeping the seeds moist by periodically flooding water to the transparent cans for a second predetermined time period and then draining the water off; monitoring growth of the seeds by a camera system; and maintaining temperature and humidity at predetermined values.

BRIEF DESCRIPTION OF THE DRAWINGS

FIG. 1 is a side view of a seed of a prior art in examples of the present disclosure.

FIG. 2 is a side view of a sprout of a prior art in examples of the present disclosure.

DETAILED DESCRIPTION OF THE INVENTION

Figure 3:
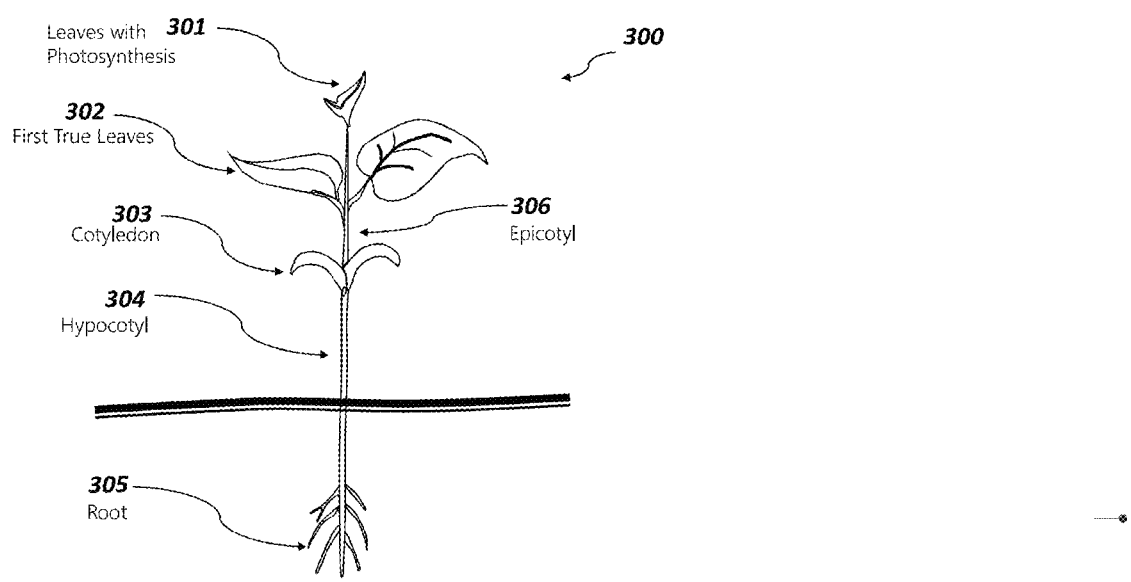
FIG. 3 is a side view of a portion of a microgreen in examples of the present disclosure.
Figure 4:
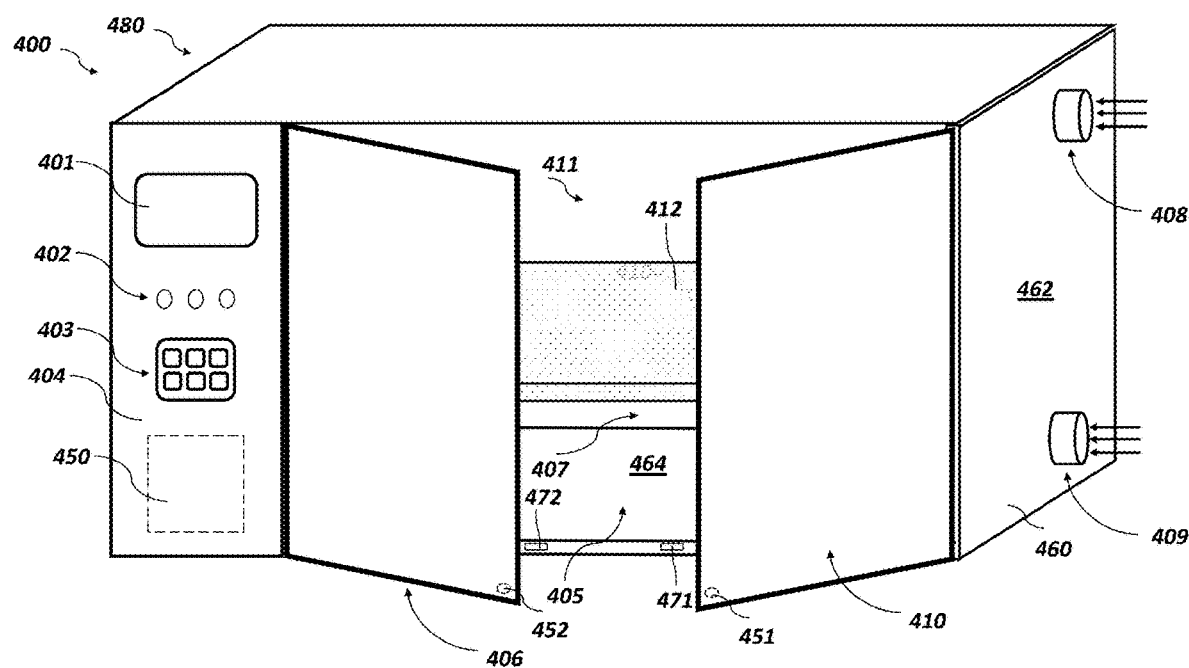
FIG. 4 is a perspective view of a plant growing system in examples of the present disclosure.
Figure 5:
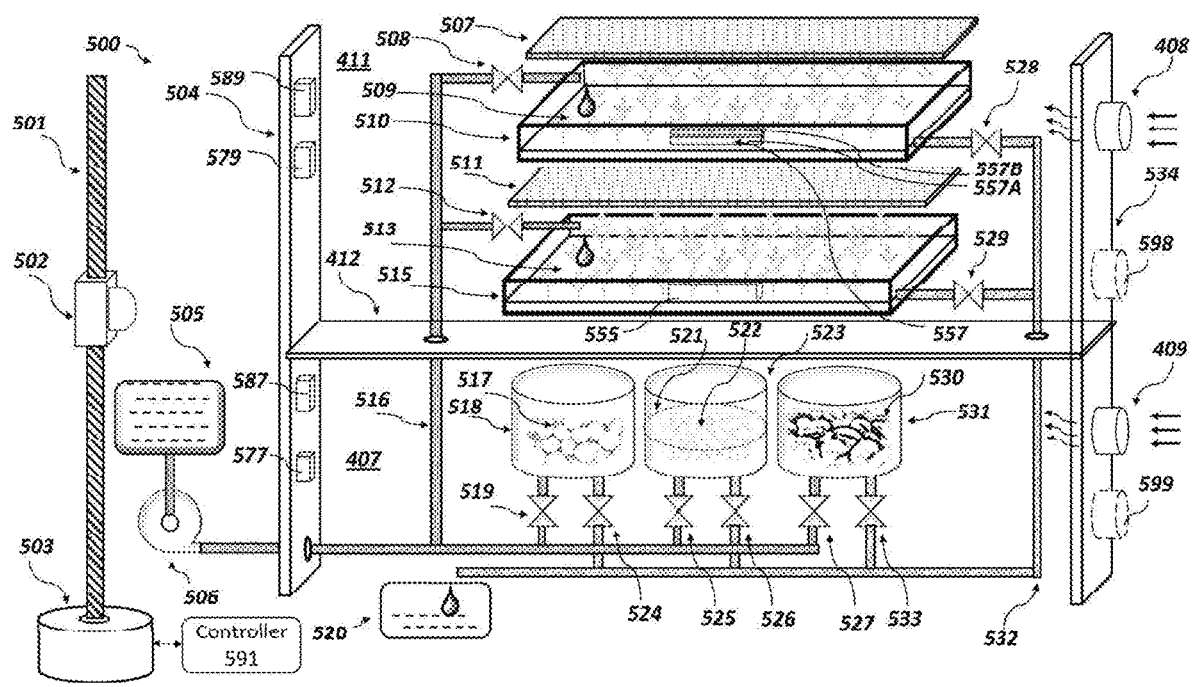
FIG. 5 is a perspective view of a portion of components of the plant growing system of FIG. 4 in examples of the present disclosure.

FIG. 4 is a perspective view of a plant growing system 400 in examples of the present disclosure. The plant growing system 400 includes a housing 480, two or more transparent cans (for example, three transparent cans 518, 523 and 531 are shown in FIG. 5), and two or more trays (for example, 510 and 515 of FIG. 5). The housing has an internal space 405. The two or more transparent cans (for example, three transparent cans 518, 523 and 531 are shown in FIG. 5) are disposed in a lower chamber 407 of the internal space 405 of the housing 480. The two or more trays (for example, 510 and 515 of FIG. 5) are arranged vertically in an upper chamber 411 of the internal space 405 of the housing 480. The housing 480 includes a front panel 404, a plurality of wall panels 460 (including sidewall panels, a cover panel and a base panel), and one or more doors (for example, two doors 406 and 410 are shown in FIG. 4). In examples of the present disclosure, the front panel 404 has a display 401, a plurality of indicators 402, and a user input panel 403. In one example, the user input panel 403 is a keypad. In another example, the user input panel 403 is a touch screen.

In examples of the present disclosure, each of the plurality of wall panels 460 includes a thermally insulating material (for example, fiberglass or polyurethane). In examples of the present disclosure, two or more temperature sensor systems (for example, two temperature sensor systems are shown in FIG. 5)

In example of the present disclosure, an electronics box 450 (shown in dashed lines) is located behind the front panel 404. In example of the present disclosure, all controlling electronics are installed in the electronics box 450.

The internal space 405 is divided into an upper chamber 411 and a lower chamber 407 by a thermally insulating separator 412. In one example, the thermally insulating separator 412 includes a fiberglass material. In another example, the thermally insulating separator 412 includes a polyurethane material. The upper chamber 411 and the lower chamber 407 are respectively kept at two different temperatures by thermal units 408 and 409. In one example, each of the thermal units 408 and 409 includes a fan (excluding a heater). In another example, each of the thermal units 408 and 409 includes a heater (excluding a fan). In still another example, each of the thermal units 408 and 409 includes a fan and a heater.

In examples of the present disclosure, the plant growing system 400 further comprises one or more magnetic lock and sensor assemblies (for example, two magnetic lock and sensor assemblies 471 and 472 are shown in FIG. 4) directly attached to a front surface of a base panel of the plurality of wall panels 460; and one or more steel pieces (for example, two steel pieces 451 and 452 are shown in FIG. 4) attached to the one or more doors 406 and 410. In one example, each of the one or more steel pieces 451 and 452 (shown in dashed lines) is directly attached to a back surface of a respective door of the one or more doors 406 and 410. In examples of the present disclosure, each of the one or more magnetic lock and sensor assemblies includes a magnet and a force sensor. The magnet is used to attract the one or more steel pieces 451 and 452. The force sensor is used to measure a contact force between each of the one or more steel pieces 451 and 452 and a respective magnetic lock and sensor assembly of the one or more magnetic lock and sensor assemblies 471 and 472. If the contact force is larger than a predetermined threshold, the door is closed. If the contact force is smaller than the predetermined threshold, the door is open. In one example, the predetermined threshold is one pound force. In another example, the predetermined threshold is 0.1 pound force. In still another example, the predetermined threshold is 0.01 pound force.

In examples of the present disclosure, each of the plurality of wall panels 460 of the housing 480 and the thermally insulating separator 412 are transparent. In examples of the present disclosure, an outer surface of each of the plurality of wall panels 460 of the housing 480 is coated with a reflective coating 462. The reflective coating 462 has a reflectivity larger than 85% under a normal incidence of light having the wavelength in the range from 450 nm to 700 nm. In one example, the reflective coating 462 comprises a plurality of coating layers. At least one of the plurality of coating layers is aluminum.

In examples of the present disclosure, a bottom surface of the thermally insulating separator 412 and an inner surface of each of the plurality of wall panels 460 of the housing 480 is coated with a reflective coating 464. The reflective coating 464 has a reflectivity larger than 90% under a normal incidence of ultraviolet light. In one example, the reflective coating 464 comprises a plurality of coating layers. At least one of the plurality of coating layers is magnesium fluoride.

FIG. 5 is a perspective view of a portion of components 500 of the plant growing system 400 of FIG. 4 in examples of the present disclosure. The lower chamber 407 and the upper chamber 411 are insulated from each other.

In examples of the present disclosure, two or more temperature sensor systems (for example, two temperature sensor systems 577 and 579 are shown in FIG. 5) and two or more humidity sensor systems (for example, two humidity sensor systems 587 and 589 are shown in FIG. 5) are directly attached to a panel 504. In one example, the panel 504 is one of the sidewall panels of the plurality of wall panels 460 of FIG. 4.

In examples of the present disclosure, seeds are packed in a fabric bag having a first side made of high open area cheese-cloth, a non-woven matrix of rockwool, a non-woven matrix of natural fiber (for example, hemp), or a spongy matrix of open cell sponge.

The lower chamber 407 contains a plurality of transparent cans (for example, three transparent cans 518, 523 and 531 are shown in FIG. 5) for growing sprouts. The transparent cans 518, 523 and 531 are filled with seeds 517, 522 and 530 up to a predetermined level. The transparent cans 518, 523 and 531 are filled with water from a reservoir 505 pumped through a pump 506 through actuated inlet valves 519, 525, and 527. In examples of the present disclosure, the transparent cans 523 is filled with water to a predetermined water level 521. The predetermined water level 521 is determined at least in part by a recipe for the seeds 522.

The seeds are initially soaked at the ambient temperature of the lower chamber 407 for a predetermined time period determined by the recipe for that seed. In one example, the predetermined period is in a range from 6 hours to 24 hours. After the predetermined time period, the valves 524, 526 and 533 are opened and water is drained through the manifold 532 to the waste water chamber 520. The valves 524, 526 and 533 can be operated independently so that the schedule of different seeds can be different.

After the initial soaking, the seeds are kept moist by periodically flooding for a brief period of time (for example, from 0.5 minute to 5 minutes) and then draining the water off.

Temperature of the lower chamber 407 is maintained by the thermal unit 409. The thermal unit 409 includes a heating element (heater) and a fan. The fan brings in outside air to inside, while the heating element heats it to the desired temperature. In this arrangement, the chamber temperature is always maintained at same or above the ambient temperature. If the colder than ambient temperatures are desired in the chamber, the thermal unit can be provisioned with a cooling Peltier thermo-electric device 599 (shown in dashed line).

The growth of the seeds is monitored by a camera 502. Accordingly, temperature settings and watering schedules are controlled in the lower chamber 407.

The upper chamber 411 contains two or more trays (for example, two trays 510 and 515 are shown in FIG. 5) for growing microgreens. Seeds are distributed in the trays 510 and 515 at a beginning of a growing cycle. The trays 510 and 515 are flooded with water provided from the reservoir 505 and pump 506 through the valves 508 and 512 in manifolds 516. The trays 510 and 515 are filled with water to a predetermined level determined by the recipe for the respective seed.

In examples of the present disclosure, the seeds are initially soaked at the ambient temperature of the upper chamber 411 for a predetermined time period determined by the recipe for the respective seed. In one example, the predetermined period is in a range from 6 hours to 24 hours. After that time interval, the valves 528 and 529 are opened and water is drained to the manifold 532 to the waste water chamber 520. In examples of the present disclosure, the valves 528 and 529 are operated independently so that the schedule of different seeds can be different.

After the initial soaking, the seeds are kept moist by periodically flooding for a brief period of time (for example, from 0.5 minute to 5 minutes) and then draining the water off.

Temperature of the upper chamber 411 is maintained by the thermal unit 408. The thermal unit 408 includes a heating element (heater) and a fan. The fan brings in outside air to inside, while the heating element heats it to the desired temperature. In this arrangement, the chamber temperature is always maintained at same or above the ambient temperature. If the colder than ambient temperatures are desired in the chamber, the thermal unit can be provisioned with a cooling Peltier thermo-electric device 598 (shown in dashed line).

In examples of the present disclosure, two or more water measuring systems (for examples, two water measuring systems 555 and 557 are shown in FIG. 5) are directly attached the two or more trays 510 and 515. Each of the two or more water measuring systems 555 and 557 comprises a plurality of resistive heaters and a plurality of thermistors. A respective resistive heater 557A of the plurality of resistive heaters is directly attached to a top surface of a base of each of the two or more trays 510 and 515. A respective thermistor 557B of the plurality of thermistors is directly attached to a top surface of each resistive heater 557A of the plurality of resistive heaters. A top surface of each thermistor 557B of the plurality of transistors directly contacts a respective growing medium so that the water content in the respective growing medium is determined from thermal conductivity of the respective growing medium.

The growth of the seeds 509 and 513 are monitored by camera 502. Accordingly, temperature settings and watering schedules are controlled in the upper chamber 411.

In examples of the present disclosure, plants needs light (for example, herbs) to conduct photosynthesis are placed in the upper chamber 411. In examples of the present disclosure, plants do not need light (for example, sprouts and microgreens) to conduct photosynthesis are placed in the lower chamber 407. In examples of the present disclosure, though the microgreens do not need light to conduct photosynthesis, the microgreens are placed in the upper chamber 411. In examples of the present disclosure, the herbs need light to conduct photosynthesis, the herbs will not be placed in the lower chamber 407.

In examples of the present disclosure, two or more lighting panels (for example, two lighting panels 507 and 511 are shown in FIG. 5) are placed over the two or more trays 510 and 515 respectively, to provide the plant light for photosynthesis or to provide ultraviolet light source shining disinfecting light on the two or more trays 510 and 515.

The levels of seeds, water, and stage of growth in transparent cans 518, 523, 531 and trays 510 and 515 are visually monitored by the camera 502. The camera 502 travels up and down on a shaft 501 with the aid of the motor 503 controlled by a controller 591.

Figure 6:
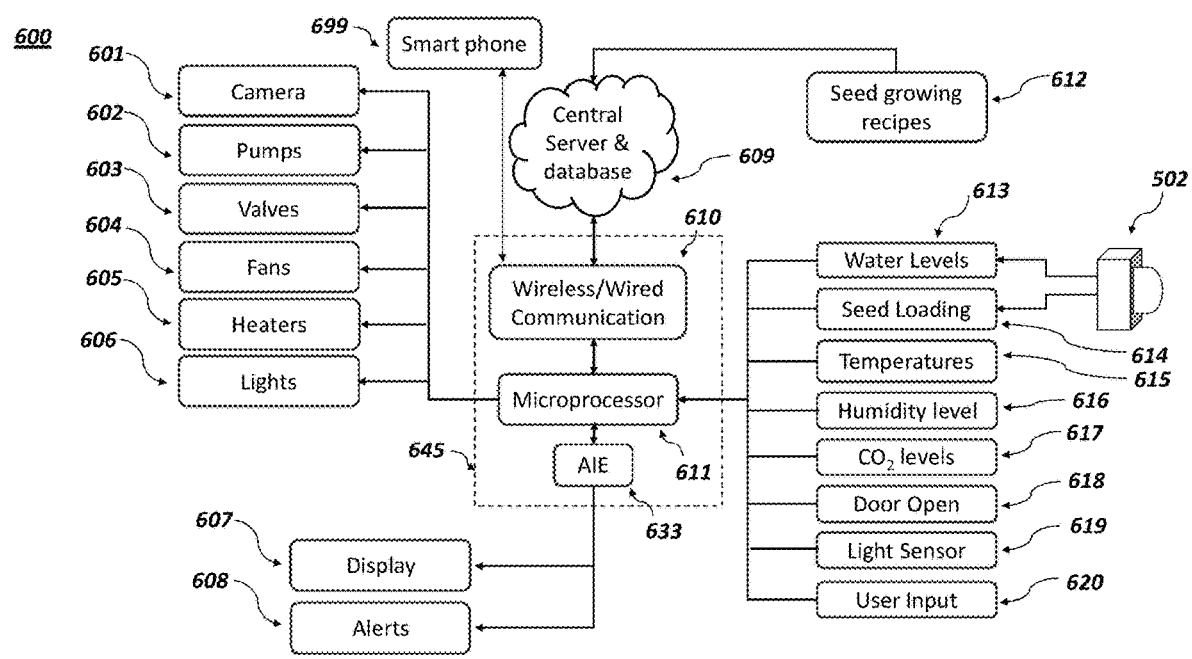
FIG. 6 is a control and sensor diagram of the plant growing system of FIG. 4 in examples of the present disclosure.

FIG. 6 is a control and sensor diagram 600 of the plant growing system 400 of FIG. 4 in examples of the present disclosure. A computer 645 (shown in dashed lines) includes a microprocessor or processor 611, memory of the computer 645, an artificial intelligence engine (AIE) 633 and an interface engine (wireless or wired communication) 610. The microprocessor or processor 611 processes incoming sensor signals, communicates essential data with a knowledge base on a central server and database 609, raises corresponding alerts and displays and controls several mechanisms in the plant growing system 400.

In examples of the present disclosure, the incoming sensor signals include signals of water levels 613 determined by the camera 502, signals of seed loading levels 614 determined by the camera 502, signals of temperature sensors 615 distributed around the plant growing system 400 of FIG. 4, signals of humidity level sensors 616 distributed around the plant growing system 400 of FIG. 4, signals of carbon dioxide ($CO_2$) levels 617 in the plant growing system 400 of FIG. 4, signals of door open (or closed) 618, signals of ambient light 619 in the plant growing system 400 of FIG. 4, and signals of user input 620 from the user input panel 403 (touchpad or keypad) of FIG. 4.

The microprocessor or processor 611 processes the incoming sensor signals and makes decisions to control the instruments for watering, heating, lighting, air-flowing, and picture taking. Specifically, the controls and actuations include the camera 502 movement and picture taking 601, pumps 602, valves 603, fans 604 in the thermal units, heaters 605 in thermal units, and lighting panels 606.

The microprocessor or processor 611 puts vital information about the plant growing system 400 of FIG. 4 on the display 607. In examples of the present disclosure, the microprocessor or processor 611 sends useful alerts 608 to visible LEDs or as a buzzer sound.

In examples of the present disclosure, a predetermined amounts of decisions about the operation of the plant growing system 400 of FIG. 4 are too complex or memory intensive for the microprocessor or processor 611 to make. The microprocessor or processor 611 may upload critical parameters and growth photos to a central server and database 609, which may then process the information and then give operational recommendations to the microprocessor or processor 611.

The communication 610 between the plant growing system 400 of FIG. 4 and the central server and database 609 may be wired or wireless. One example is microprocessor or processor 611 communicating with a central server and database 609 in an AMAZON AWS system over WIFI. Another example is microprocessor or processor 611 communicating with a smart phone 699 nearby with BLUETOOTH wireless. Seed growing recipes 612 for different seeds may be loaded to the central server and database 609 for many plant growing systems to communicate with. The recipes may be crowd-shared as a social activity.

In examples of the present disclosure, the microprocessor or processor 611 processes image data taken from the camera 502 of FIG. 5 and decomposes the image data into a set of parameters. The set of parameters includes height, shape, and color of the sprouts or microgreens.

In examples of the present disclosure, the AIE 633 suggests an optimal seed growing recipe (a selected one of the seed growing recipes 612) based on calculations and comparisons of different sets of parameters including heights, shapes, and colors of the sprouts or microgreens using the seed growing recipes 612 during predetermined time periods. In one example, the computer 645 further comprises algorithms controlling the AIE 633. In another example, the interface engine (wireless or wired communication) 610 of the computer 645 communicates with a remote server (central server and database 609). The remote server (central server and database 609) comprises algorithms controlling the AIE.

Those of ordinary skill in the art may recognize that modifications of the embodiments disclosed herein are possible. For example, a total number of the cans and a total number of the trays may vary. Other modifications may occur to those of ordinary skill in this art, and all such modifications are deemed to fall within the purview of the present invention, as defined by the claims.

The invention claimed is:
1. A plant growing system comprising
a housing having an internal space, the housing comprising:
a front panel;
a plurality of housing wall panels; and
a door;
an insulating separator dividing the internal space of the housing into a lower chamber and an upper chamber;
two or more thermal units each comprising a heater and a fan, each of the lower chamber and the upper chamber being directly connected to a respective thermal unit of the two or more thermal units;
two or more cans disposed in the lower chamber, each of the two or more cans being configured to receive a first plurality of seeds or a growing medium mixed with a second plurality of seeds
two or more trays arranged vertically in the upper chamber, each of the two or more trays being configured to receive a third plurality of seeds or a growing medium mixed with a fourth plurality of seeds;
a camera system monitoring growth states of sprouts or microgreens growing from the first plurality of seeds, the second plurality of seeds, the third plurality of seeds or the fourth plurality of seeds;
two or more temperature sensor systems sensing temperatures of the lower chamber and the upper chamber;

two or more humidity sensor systems sensing humidity of the lower chamber and the upper chamber;

two or more water measuring systems measuring water content in the two or more trays;

a water supply system supplying water to each of the two or more cans and each of the two or more trays, the water supply system comprising:
  a water tank;
  a water pump;
  a plurality of valves; and
  a plurality of water pipes;

two or more light sources shining light on the two or more trays located in the upper chamber; and a computer comprising:
  a processor adapted to
    process image data taken from the camera and to decompose the image data into a set of parameters;
    receive temperature data from the two or more temperature sensor systems;
    receive humidity data from the two or more humidity sensor systems;
    receive water content data from the two or more water measuring systems;
    actuate the two or more thermal units;
    actuate the water supply system; and
    actuate the two or more light sources;
  memory adapted to store the set of parameters, the temperature data, the humidity data and the water content data;
  an artificial intelligence engine (AIE) adapted to analyze the set of parameters, the temperature data, the humidity data and the water content data so as to determine the growth states of the sprouts or the microgreens and to determine target environmental conditions to optimize growing qualities and growing speeds of the sprouts or the microgreens; and
  an interface engine adapted to communicate with a user equipment (UE) device of a user and to report the growth states of the sprouts or the microgreens to the user;
wherein light having a wavelength in a range from 450 nm to 700 nm in the lower chamber of the housing is below a predetermined threshold; and
wherein the plant growing system is configured to grow the sprouts or the microgreens from the first plurality of seeds or the second plurality of seeds without a photosynthesis process using bright sunlight.

2. The plant growing system of claim 1, wherein the first plurality of seeds are packed in a fabric bag having a first side made of high open area cheese-cloth, a non-woven matrix of rockwool, a non-woven matrix of natural fiber, or a spongy matrix of open cell sponge.

3. The plant growing system of claim 1, wherein the growing medium is co-co coir.

4. The plant growing system of claim 1, wherein the heater of each of the two or more thermal units is a resistive heater.

5. The plant growing system of claim 1, wherein each of the two or more temperature sensor systems comprises two or more thermistors.

6. The plant growing system of claim 1, wherein each of the two or more water measuring systems comprises a plurality of resistive heaters and a plurality of thermistors; wherein a respective resistive heater of the plurality of resistive heaters is directly attached to a top surface of a base of each of the two or more trays; wherein a respective thermistor of the plurality of thermistors is directly attached to a top surface of each of the plurality of resistive heaters; wherein a top surface of each of the plurality of transistors directly contacts a respective growing medium so that the water content in the respective growing medium is determined from thermal conductivity of the respective growing medium.

7. The plant growing system of claim 1, wherein the camera system comprises two or more cameras and wherein each tray of the two or more trays is aligned with a respective camera of the two or more cameras.

8. The plant growing system of claim 1, wherein the camera system comprises a translation stage, a motor and a camera directly attached to the translation stage; wherein the motor drives the translation stage and wherein the translation stage moves the camera so as to take pictures of each of the two or more trays.

9. The plant growing system of claim 1, wherein the computer further comprises algorithms controlling the AIE.

10. The plant growing system of claim 1, wherein the interface engine of the computer communicates with a remote server and wherein the remote server comprises algorithms controlling the AIE.

11. The plant growing system of claim 1 further comprising a magnetic lock and sensor system comprising
  a magnet directly attached to the housing;
  a steel piece directly attached to the door; and
  a sensor;
  wherein the sensor senses a condition if the door is closed so that the steel piece contacts the magnet.

12. The plant growing system of claim 1, wherein the predetermined threshold is $1 \times 10^{-5}$ candela/m$^2$.

13. The plant growing system of claim 1, wherein an outer surface of the housing is coated with a reflective coating having a reflectivity larger than 85% under a normal incidence of light having the wavelength in the range from 450 nm to 700 nm.

14. The plant growing system of claim 13, wherein an inner surface of the housing is coated with another reflective coating having a reflectivity larger than 90% under a normal incidence of ultraviolet light.

15. The plant growing system of claim 1, wherein the two or more light sources are ultraviolet light sources and the two or more light sources shine disinfecting light on the two or more trays located in the upper chamber.

16. A method of using the plant growing system of claim 1, the method comprising the steps of:
  initially soaking the first plurality of seeds or the second plurality of seeds at an ambient temperature in the two or more transparent cans in the lower chamber for a first predetermined time period;
  keeping the first plurality of seeds or the second plurality of seeds moist by periodically flooding water to the transparent cans for a second predetermined time period and then draining the water off;
  monitoring growth of the first plurality of seeds or the second plurality of seeds by a camera system; and
  maintaining temperature and humidity at predetermined values.

* * * * *